(12) United States Patent
Vallikkat Thachaparambil et al.

(10) Patent No.: US 9,377,546 B2
(45) Date of Patent: Jun. 28, 2016

(54) AUTOMATIC EXTRACTION AND CHARACTERIZATION OF FAULT AND FRACTURE POPULATIONS

(71) Applicant: Schlumberger Technology Corporation, Sugar Land, TX (US)

(72) Inventors: Manoj Vallikkat Thachaparambil, Malappuram (IN); Renchu Wu, Beijing (CN); Dong Wang, Beijing (CN); Rui Zeng, Beijing (CN)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 547 days.

(21) Appl. No.: 13/886,740

(22) Filed: May 3, 2013

(65) Prior Publication Data

US 2013/0294197 A1   Nov. 7, 2013

Related U.S. Application Data

(60) Provisional application No. 61/643,321, filed on May 6, 2012.

(51) Int. Cl.
  *G01V 1/28*   (2006.01)
  *G01V 1/34*   (2006.01)
  *G01V 1/30*   (2006.01)

(52) U.S. Cl.
  CPC .............. *G01V 1/282* (2013.01); *G01V 1/301* (2013.01); *G01V 1/345* (2013.01); *G01V 2210/642* (2013.01); *G01V 2210/646* (2013.01); *G01V 2210/66* (2013.01); *G01V 2210/665* (2013.01); *G01V 2210/74* (2013.01)

(58) Field of Classification Search
  CPC ......... G01V 1/282; G01V 1/34; G01V 1/345; G01V 1/301; G01V 1/302; G01V 2210/74; G01V 2210/646; G01V 2210/642; G01V 2210/665; G01V 2210/66
  See application file for complete search history.

(56) References Cited

U.S. PATENT DOCUMENTS

| | | | | |
|---|---|---|---|---|
| 5,661,698 A * | 8/1997 | Cacas | ................... | G01V 1/282 367/73 |
| 6,351,991 B1 * | 3/2002 | Sinha | ................... | E21B 49/006 367/27 |
| 7,480,205 B2 * | 1/2009 | Wei | ....................... | G01V 1/282 367/37 |
| 7,486,589 B2 * | 2/2009 | Lee | ........................ | G01V 11/00 367/35 |
| 7,869,954 B2 * | 1/2011 | den Boer | .............. | G01V 11/00 367/25 |

(Continued)

OTHER PUBLICATIONS

International Search Report and Written Opinion of PCT Application No. PCT/US2013/039630 dated Aug. 13, 2013: pp. 1-14.

(Continued)

*Primary Examiner* — Ari M Diacou (57) ABSTRACT

Systems, methods, and computer-readable media for modeling a fracture network are provided. The method includes mapping a sub-seismic data set to a portion of a seismic-resolution data set, and defining a fractal region of the seismic-resolution data set containing the portion thereof to which the sub-seismic data is mapped. The method also includes generating a training image for sub-seismic scale characteristics of the one or more fracture networks of the seismic-resolution data set using the portion of the seismic-resolution data, and modeling the sub-seismic scale characteristics of the one or more fracture networks of the fractal region of the seismic-resolution data set outside of the portion, using the training image.

20 Claims, 6 Drawing Sheets

(56) References Cited

U.S. PATENT DOCUMENTS

| | | | |
|---|---|---|---|
| 8,311,788 B2* | 11/2012 | Hurley | G06T 17/00 703/10 |
| 8,725,477 B2* | 5/2014 | Zhang | E21B 49/00 703/10 |
| 8,780,671 B2* | 7/2014 | Sayers | G01V 11/00 367/25 |
| 9,053,570 B1* | 6/2015 | Mallet | G06T 17/05 |
| 2002/0010570 A1* | 1/2002 | Malthe-Sorenssen | G01V 1/282 703/10 |
| 2003/0112704 A1* | 6/2003 | Goff | G01V 1/30 367/72 |
| 2004/0117121 A1* | 6/2004 | Gray | G01V 1/30 702/11 |
| 2006/0052938 A1 | 3/2006 | Thorne et al. | |
| 2008/0225640 A1 | 9/2008 | Akbar et al. | |
| 2009/0231955 A1 | 9/2009 | Barnes | |
| 2011/0205844 A1 | 8/2011 | Maucec et al. | |
| 2011/0231164 A1 | 9/2011 | Zhang et al. | |
| 2011/0251833 A1* | 10/2011 | Mariethoz | G01V 11/00 703/2 |
| 2012/0010865 A1* | 1/2012 | Benson | G01V 11/00 703/10 |
| 2012/0084043 A1* | 4/2012 | Courtade | G01V 99/005 702/123 |
| 2012/0221306 A1 | 8/2012 | Hurley et al. | |
| 2012/0281883 A1 | 11/2012 | Hurley et al. | |
| 2013/0144579 A1* | 6/2013 | Tetzlaff | G06F 17/5009 703/6 |
| 2014/0058713 A1* | 2/2014 | Thachaparambil | G01V 1/282 703/10 |

OTHER PUBLICATIONS

Admasu Fitsum et al., "Automatic Method for Correlating Horizons across Faults in 3D Seismic Data", IEE Conference and Pattern Recognition, Washington DC, Jun. 2004, 6 pages.

Bahorich Mike et al., "3-D seismic discontinuity for faults and stratigraphic features: The coherence cube", The Leading Edge, Oct. 1995, pp. 1053-1058.

Pepper Randolph et al., "Advances in Seismic Fault Interpretation Automation", Search and Discovery Article #40169, AAPG Annual Convention, Jun. 19-22, 2005, pp. 1-16.

Strebelle S. "New Multiple-Point Statistics Simulation Implementation to Reduce Memory and CPU-Time Demand", ChevronTexaco EPTC, San Ramon, California, USA, 6 pages.

* cited by examiner

_(54)_ AUTOMATIC EXTRACTION AND CHARACTERIZATION OF FAULT AND FRACTURE POPULATIONS

CROSS-REFERENCE TO RELATED APPLICATION

This application claims priority to U.S. Provisional Patent Application Ser. No. 61/643,321 filed on May 6, 2012. The entirety of this provisional patent application is incorporated herein by reference.

BACKGROUND

Fractures are generally analyzed and interpreted along one-dimensional (scan lines) or two-dimensional (surfaces, planes, etc.) formation outcrops, image logs, seismic data, etc. to determine fracture population characteristics. These properties are then statistically described and used in fracture interpretation and modeling.

Such methods are suitable in a variety of applications; however, they may be limited as applied to three-dimensional analysis. For example, these methods may be limited due to sampling bias, whereby a three-dimensional model of an area, constructed using data about a small portion of the area, may be distorted by the small portion containing characteristics that are not representative of the surrounding areas. However, some seismic attributes are analyzed volumetrically, not as discrete planes or networks. This can make quality control, multiscale integration, and geologic characterization challenging.

SUMMARY

In general, the present disclosure includes systems and methods for automatically extracting, two-dimensional (2D) or three-dimensional (3D) fracture networks from 2D or 3D seismic data, respectively, and converting them into an in-situ seismic-scale fracture network model and a training image for modeling a sub-seismic portion of the same fracture population. Discontinuity planes may be "grown" from the seismic data using the fault/fracture points and their connections to neighboring fault/fracture points, with precision in the definition maintained to avoid approximations as to their shape and size. The planes and networks may then be classified according to geometric shape, size, and orientation. Intersections between planes may also be identified and classified, along with terminations and connectivity. Accordingly, a record of characteristics and relationships among the planes and networks may be established at seismic-resolution.

In order to model the sub-seismic portion of the natural fracture population, a sub-seismic data cube may then be mapped in a region of the seismic-resolution data, using the later as a training image. The sub-seismic data is then associated with the seismic-resolution data of the region to which it is mapped. Relationships between the sub-seismic characteristics and the seismic-resolution classifications for the networks of planes may thus be established. The relationships between the sub-seismic characteristics and the seismic-resolution networks may be employed to stochastically and deterministically model the sub-seismic fracture networks of the seismic-resolution image.

It will be appreciated that the foregoing summary is merely intended to introduce a portion of the subject matter described below and is not intended to limit the disclosure.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings.

DETAILED DESCRIPTION

Reference will now be made in detail to embodiments of the present teachings, examples of which are illustrated in the accompanying drawing. In the following description, reference is made to the accompanying drawing that forms a part thereof, and in which is shown by way of illustration an embodiment in which the present teachings may be practiced.

Figure 1:
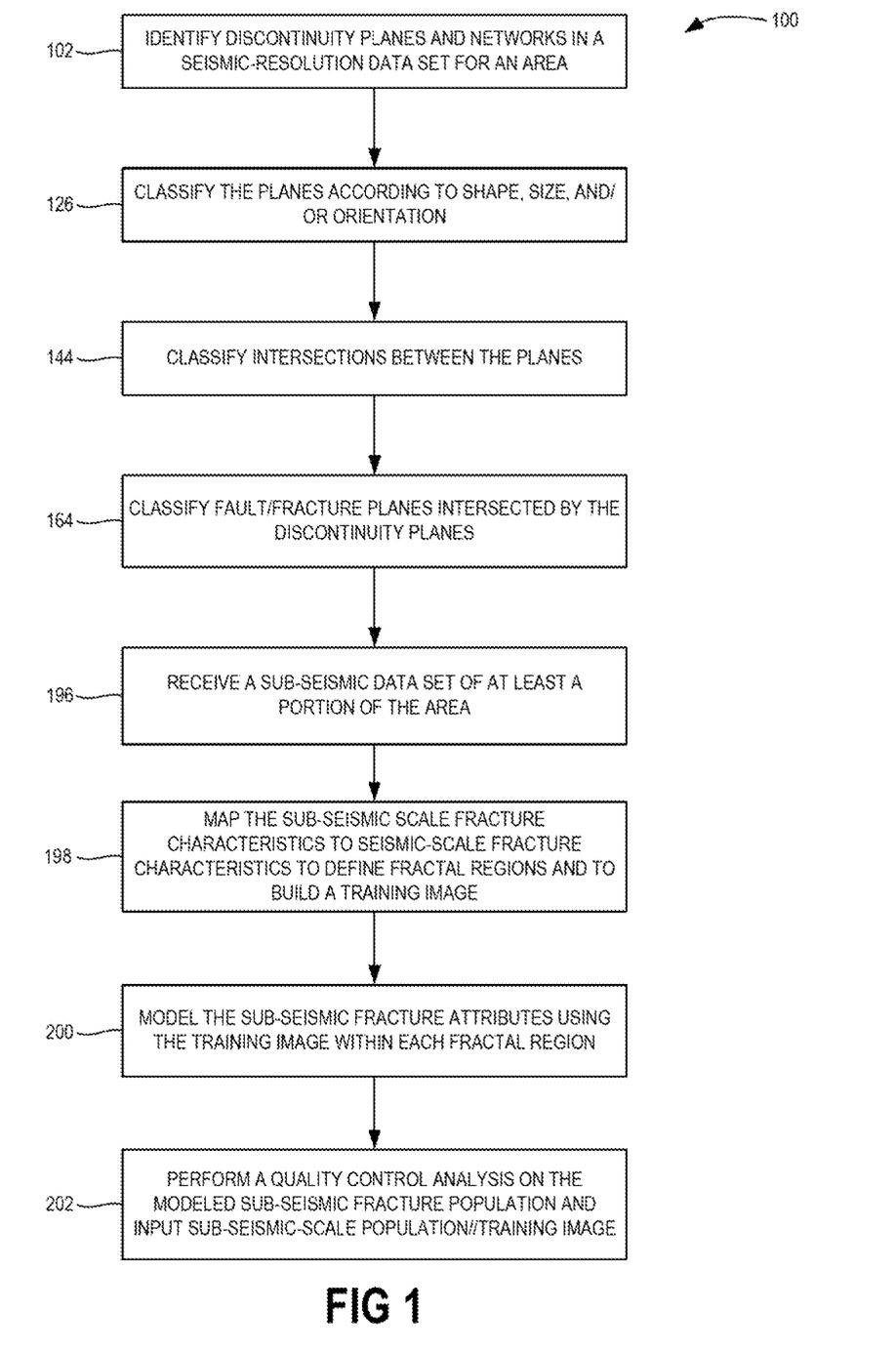
FIG. 1 illustrates a flowchart of a method for modeling a fracture network, according to an embodiment.

FIG. 1 illustrates a flowchart of a method 100 for modeling a fracture network, according to an embodiment. In an embodiment, the method 100, or certain portions thereof, may be "automatic," i.e., may proceed by operation of a processing device, as will be described below. Moreover, the method 100 may provide for the modeling of sub-seismic fractures in a seismic image based on a 3D network, rather than plane-by-plane, characteristics.

For example, the method 100 may begin by identifying discontinuity planes and 3D networks in a seismic-resolution data set or attribute cube, as at 102. The seismic attribute cube may be a seismic-resolution image of a subterranean region, which may include fracture networks. In at least one embodiment, the seismic attribute cube may be or be part of a seismic discontinuity plane (SDP) model; however, any other suitable type of seismic attribute cube may be employed. In an embodiment, identifying the discontinuity planes at 102 also referred herein as "the identification process 102") may proceed according to the flowchart illustrated in FIG. 2, for example.

Figure 2:
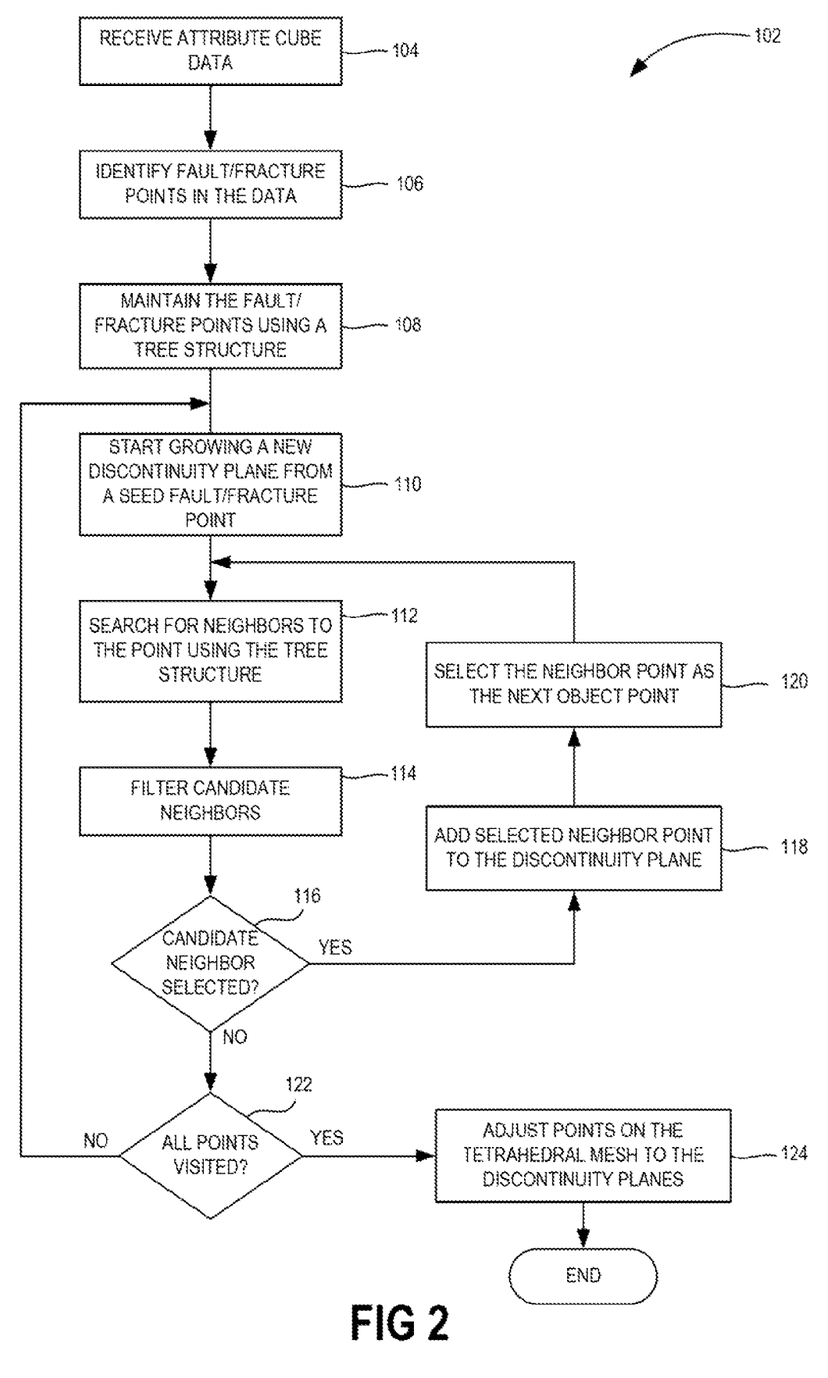
FIG. 2 illustrates a flowchart of a discontinuity plane identification process, according to an embodiment.

As shown in FIG. 2, the identification process 102 may begin by receiving attribute cube data, as at 104. The attribute cube data received at 104 may, for example, be a post-stack data set related to a subterranean area that may, for example, be collected using any suitable seismic data collection process. Further, the attribute cube data may include a tetrahedral mesh.

Points may be defined in the cube data, and a subset thereof may define discontinuities. For example, the points may be located using, parallel XY planes, spaced apart in a Z-direction, cutting through a portion of the attribute image. The identification process 102 may proceed to identifying the fault/fracture points in the cube data, as at 106. In an example, the fault/fracture points identified may be all of the fault/fracture points that exist in the cube data. In another example, the fault/fracture points may be a subset thereof.

Further, the identification process 102 may include maintaining the fault/fracture points using a tree data structure, as at 108, for example, a k-d tree. More particularly, the tree structure may be organized such that each fault/fracture point of the tree is connected to its neighbors in the tree data structure. Whether two points are "neighboring" may be determined, for example, according to the distance between them. The distance may be set, for example, at the smallest amount supported by the resolution of the attribute cube, which may retain the closest approximation available of complex and/or curves surfaces. In other embodiments, the distance may be any other amount and/or may be selectable by a user, for example, to preserve computing resources.

With the tree data structure maintained at 108, the identification process 102 may proceed to growing a new discontinuity plane from a first fault/fracture point, referred to as a "seed" fault/fracture point, as at 110. For example, the identification process 102 may include selecting a point associated with a node of the tree data structure, according to any suitable searching algorithm, to serve as the genesis point for the plane. The identification process 102 may then include searching for neighbors to the point using the tree data structure, as at 112. The neighbors may be identified as candidate neighbors, i.e., those that are connected to the seed fault/fracture point in the tree data structure.

However, a neighbor fault/fracture point being close to the seed fault/fracture point may not be sufficient to be determinative of the neighbor fault/fracture point being in the same discontinuity plane as the seed fault/fracture point; it may be part of another plane, for example. Accordingly, identification process 102 may include filtering the candidate neighbor points identified at 112, as at 114. The candidate neighbor points may be filtered or otherwise analyzed according to a variety of factors, which may include local orientation information, planarity, waviness, dip, strike expected in a particular geological region, any other trends identified in the data, and the like. Thus, the filtering at 114 may result in identifying candidate neighbor points that are likely part of the same discontinuity plane as the seed fault/fracture point, and/or rejecting neighbor candidates that are not likely part of the same discontinuity plane. Accordingly, determining consistency with regard to any of the aforementioned factures may facilitate giving priority to neighboring points that are more likely to be part of the same plane as the seed fault/fracture point.

The identification process 102 may then proceed to determining whether a candidate neighbor point is identified, as at 116. If one or more candidate neighbor points are identified, the identification process 102 may include adding the candidate neighbor point(s) to the discontinuity plane, as at 118, such that the discontinuity plane grows from the seed point, as at 120. One or more of the candidate neighbor points may then be selected as the next object point, as at 120, and the searching, filtering, and adding may be repeated.

On the other hand, if no candidate neighbor points are found at 116, the identification process 102 may determine that the end of the discontinuity plane has been reached. Accordingly, the identification process 102 may include determining whether there are additional fault/fracture points in the tree that have not yet been considered as seed points for new discontinuity planes, as at 122. If additional points do exist, the identification process 102 may start a new discontinuity plane, growing, it from a new seed point, as at 110. In some cases, each fault/fracture point may be considered as a seed point. In other cases, each fault/fracture point may be considered as an object point, but not necessarily a seed point.

If however, there are no additional points for consideration as object points, the growing of the discontinuity planes may be complete. The identification process 102 may thus proceed to a post-growing portion of identification process 102, in which points of the tetrahedral mesh may be adjusted, as at 124, Such adjustment at 124 may promote a more accurate description of the discontinuity planes. In an embodiment, this may proceed by finding the nearest vertices of the tetrahedral mesh to the planes (i.e., to the points and/or lines connecting the points) and moving the vertices to coincide with the planes. Accordingly, the mesh may conform to the contours of the discontinuity planes, providing a more precise depiction thereof and avoiding "best-fit" two-dimensional plane approximations. On a seismic scale, for example, a small deviation to create a two-dimensional plane may result in large real-space changes on the order of tens of meters, or more, which can reduce the usefulness of the model.

Referring back to FIG. 1, with the discontinuity planes defined at 102, the method 100 may proceed to classifying the discontinuity planes according to size, shape, and/or orientation, as at 126. Classifying the planes may, for example, assist in identifying characteristics of the planes that may be shared within planes of a given classification. Further, it may assist in determining orientation of a fracture, which may provide insight into expected fluid-flow characteristics of the formation. For example, if the shape is elongated and the orientation is vertical, it may indicate a strongly preferential vertical flowpath. A variety of such relationships may be established by one with skill in the art.

Figure 3:
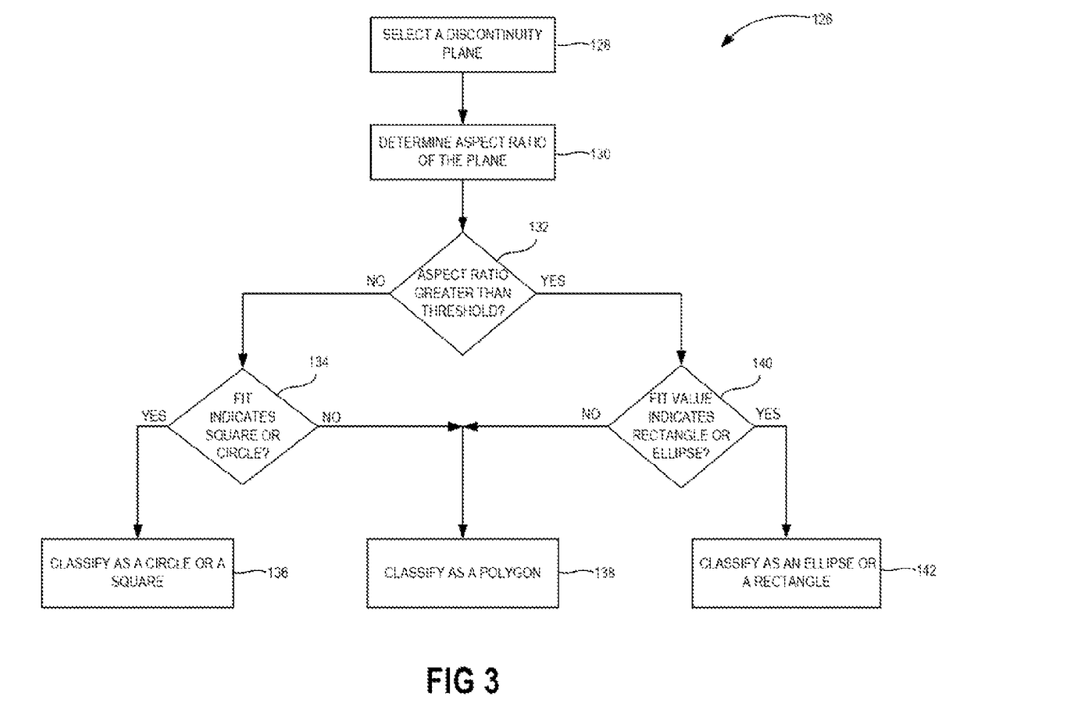
FIG. 3 illustrates a flowchart of a plane classification process, according to an embodiment.

Classifying the planes according, to shape, size, and/or orientation at 126 may proceed in any suitable manner. FIG. 3 illustrates a flowchart of one particular embodiment of classifying one of the planes at 126 (also referred to herein as "plane classification process 126"), which may be repeated for each of the planes defined at 102, or a subset thereof.

The plane classification process 126 may begin by selecting a discontinuity plane, as at 128. The discontinuity planes may each define an aspect ratio, which may be determined, as at 130. The aspect ratio may be a relation between two dimensions or axes that at least partially define the shape, with the larger dimension being the denominator. The dimensions/axes need not be linear, but may follow the contours of the plane with which they are associated. The dimensions may be, for example, a major and minor diameter in an ellipse, a length and width in a rectangle, etc. Further, the two dimensions may be the largest two dimensions defined by the plane. Accordingly, if the ratio is one, the ratio may indicate that two dimensions are the same, which may potentially indicate that the plane is a square or circle. On the other hand, if the ratio is not one, the ratio may be indicative of an ellipse, rectangle, or the like.

The plane classification process 126 may also include determining whether the aspect ratio is greater than a ratio threshold, as at 132. The ratio threshold may be preset or may be selectable by a user. The ratio threshold may be set to identify those planes that have nearly the same first and second dimensions. Accordingly, the aspect ratio threshold may be set to, for example, about 0.9. In various contexts, any other aspect ratio may be employed.

If the aspect ratio is greater than the threshold (i.e., between the threshold and one, or at one), the plane classification process 126 may then proceed to determining whether the plane fits with a square or a circle, as at 134. Such a determination may proceed by, for example, comparing the plane area to the area of a circle or square with the same dimensions. If the difference is within a threshold percentage (either selectable or preset), the plane may be classified as a square or circle, as at 136. Otherwise, the plane may be classified generically as a polygon, as at 138. Any other method for determining fit may also or instead be employed.

Returning to comparing the aspect ratio to the ratio threshold at 132, if the aspect ratio falls below the threshold, the method 100 may proceed to determining whether the fit value indicates a rectangle or an ellipse, as at 140, again, using an area or any other type of comparison. If the fit value is above the threshold, the plane may be classified as an ellipse or rectangle, as appropriate, as at 142. If the fit value is below the threshold, the plane may be classified as a polygon, as at 138. Accordingly, each of the planes may be classified and/or categorized into one or more of a rectangle, square, circle, ellipse, or polygon, at least according to the aspect ratio.

The dimensions may also be employed to determine orientation and size of the plane. Moreover, such information about shape, orientation, and/or size may be indicative of shared geological properties, and of formation constraints. Further, the classification process 126 may be automated and may be configured to handle thousands of surfaces in a matter of seconds, for example.

Figure 4:
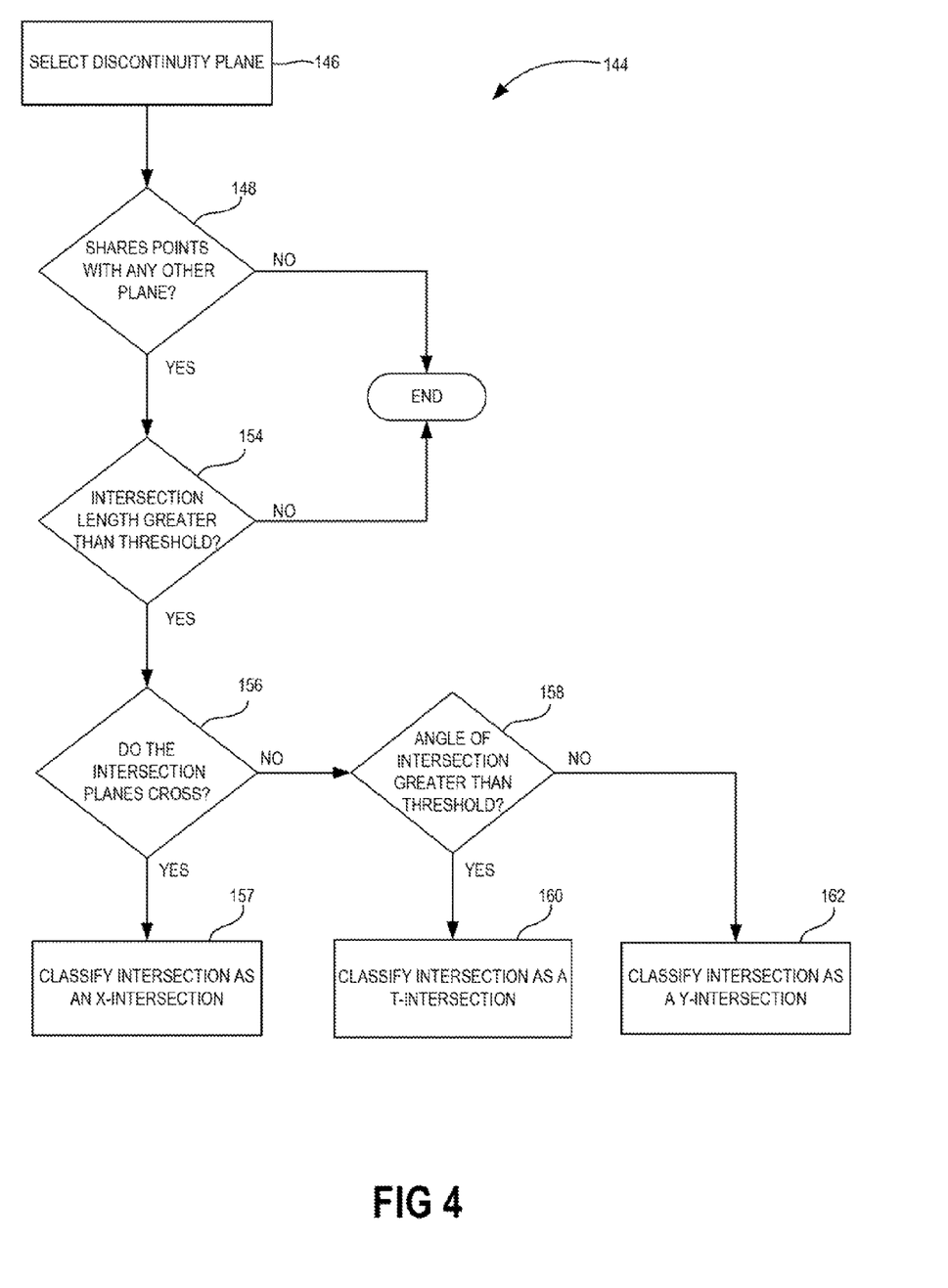
FIG. 4 illustrates a flowchart of a plane intersection classification process, according to an embodiment.

Referring back to FIG. 1, before, during, or after classifying the planes at 126, the method 100 may include classifying intersections between the planes, as at 144. FIG. 4 illustrates an embodiment of classifying, the intersections between planes at 144 (which may also be referred to as an "intersection classification process 144"). It will be appreciated, however, that any other suitable process for classifying the intersections between planes may be employed consistent with the present disclosure.

The intersection classification process 144 may begin by selecting a first discontinuity plane, as at 146. The points of the discontinuity plane may then be searched against the points of other discontinuity planes according to any searching algorithm, so as to determine if any other discontinuity planes share one or more points with the first discontinuity plane, as at 150. If no shared points are found, it may indicate that the selected discontinuity plane does not intersect any other planes, and thus the analysis may be concluded.

If shared points are found, however, it may indicate that the selected discontinuity plane intersects a second discontinuity plane. Accordingly, the length of the intersection may be defined by the shared points may be determined and compared to a threshold length as at 154. It will be appreciated that the intersection may have any shape. Further, the threshold intersection length may be preset or may be selectable by a user so as to limit classification to physically relevant intersections.

With a relevant (i.e., with a length above the threshold) intersection identified, the intersection classification process 144 may then proceed to determining the characteristics of the intersection. Accordingly, intersection classifying, process 144 may proceed to determining whether the planes cross, or whether at least one terminates at the intersection with the other, as at 156. If the planes cross, such that each continues for a distance after the intersection points, the intersection may be classified as an X-shaped intersection (or, more simply, an "X intersection"), as at 157. If at least one of the planes terminates at the intersection, the intersection classification process 144 may proceed to measuring the angle of the intersection, as at 158, i.e., at least one angle defined between the two planes. If the angle of intersection is above a threshold (preset or user selected), the intersection may be classified as a T-shaped intersection (a "T intersection"). If the angle of intersection is below the threshold, the intersection may be classified as a Y-shaped (a "Y intersection"), as at 162. Accordingly, it will be appreciated that, for purposes of this example, the angle of intersection may be selected as a lesser of two angles (i.e., an acute angle) defined between the two planes at the intersection. However, in other cases, the angle of intersection may be the greater of two angles, such that if the angle of intersection is above the threshold, it is indicative of a Y-intersection.

Figure 5:
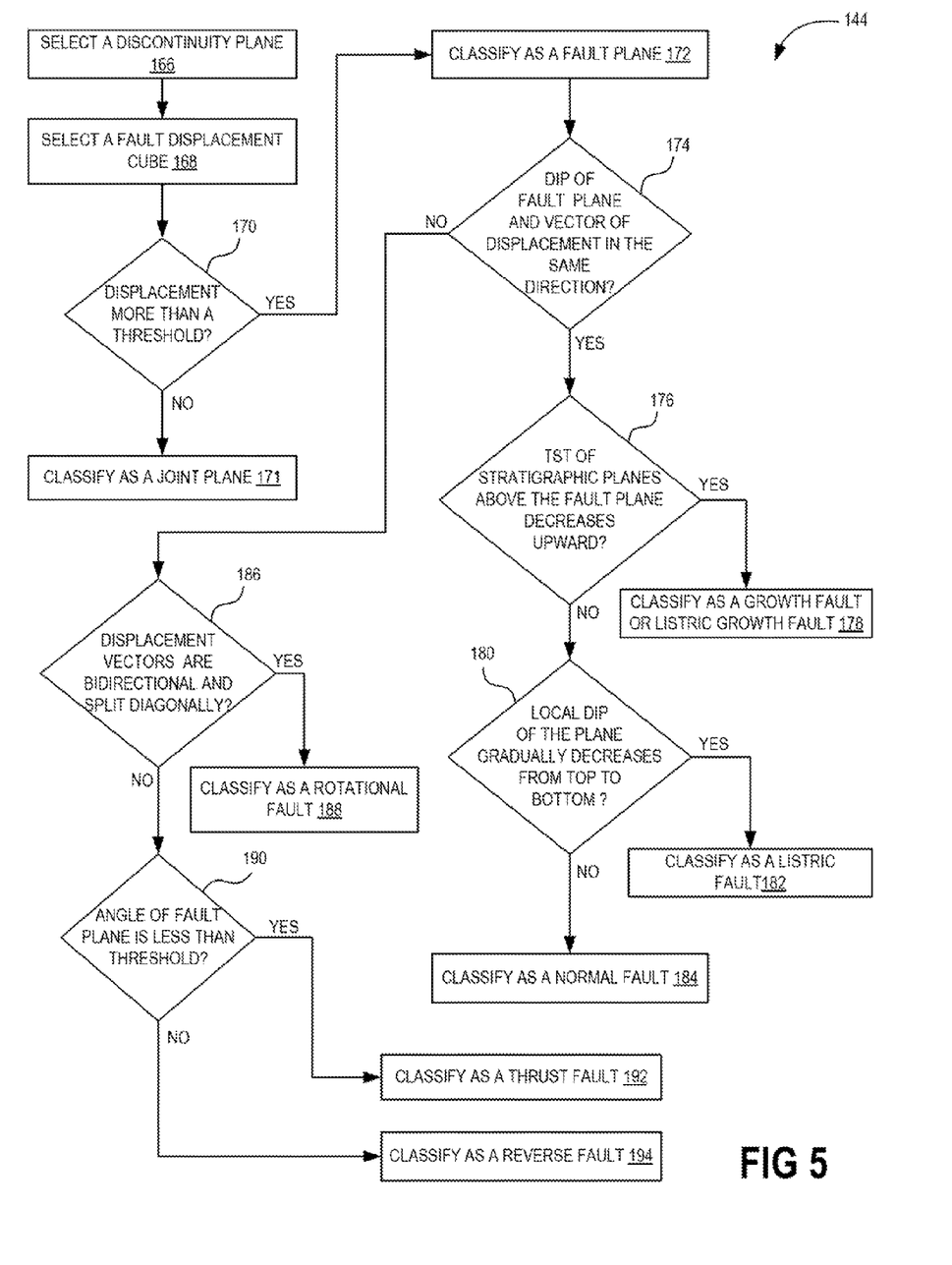
FIG. 5 illustrates a flowchart of a fault classification process, according to an embodiment.

Referring back to FIG. 1, before, during, or after classifying the planes at 126 and classifying the intersections at 144, the method 100 may also include classifying faults in fault displacement data, using the defined discontinuity planes, as at 164. This may provide data points establishing relationships between different, sizes, shapes, orientations, etc. of discontinuity planes/networks and their interaction with specific types of faults. FIG. 5 illustrates an example of classifying the faults at 164 also referred to herein as "fault classification process" 164). Accordingly, as shown, the fault classification process 164 may begin with selecting a discontinuity plane, as at 166 and selecting a fault displacement cube, as at 168 in either order.

The fault displacement cube may contain information about horizon displacement in a region containing a fracture. Accordingly, discontinuity planes associated with the area defined in the cube of the fracture model may be classified according to the type of fault, if any, with which they may be associated. The first determination may be to decide whether the discontinuity plane selected at 166 meets a true fault plane. Thus, the classifying at 164 may proceed to determining whether the selected discontinuity plane meets a fracture plane with a displacement above a threshold (user defined or preset), as at 170. If the displacement is less than the threshold, the fracture plane may be identified as a joint plane, as at 171, thereby ending the classification at 164, for example. If the displacement is above the threshold, the fracture plane may be identified as a fault plane, as at 172.

Next, to further classify the fault plane, the dip of the fault plane and the displacement vector direction may be considered, as at. 174. if the dip and the vector are in the same direction, the fault plane may be a normal fault or a special case thereof. Accordingly, the classifying at 164 may include determining, whether the True Stratigraphic Thickness (TST) of the stratigraphic planes above the fault plane decreases as proceeding upward, away from the fault plane, as at 176. If the TST does so decrease, the fault plane may thus be characterized as a listric growth fault or more generically as a growth fault, as appropriate, at 178. If not, the classification at 164 may proceed to determining whether the local dip of the fault plane gradually decreases from top to bottom, as at 180. If it does, the fault plane may be classified as a listric fault, as at 182. If not, it may be classified more generically as a normal fault, as at 184.

Returning to considering whether the dip of the fault plane and the displacement vector are oriented in the same direction at 174, if they are determined not to be, the fault classification process 164 may proceed to determining whether the displacement vectors are bidirectional and split diagonally, as at 186. If they are, the fault plane may be classified as a rotational fault, as at 188. If not, the fault plane may be determined to be a type of reverses fault. Thus, the fault classification process 164 may proceed to determining if the dip angle of the fault plane is less than a threshold (preset or user defined), as at 190. If it is, the fault classification process 164 may classify the fault plane as a thrust fault, as at 192, and as a reverse fault, as a 194, otherwise.

Returning to FIG. 1, the method 100 may proceed to receiving a sub-seismic data set, for example, fracture data from a well log, core sample, outcrop analogue data, or the like, as at 196. The sub-seismic data set may include data indicative of fracture size, shape, orientation, termination/intersection, distribution, networks, and the like, which may be collected using any suitable process. For example, the sub-seismic data set may include uncensored fracture length, size distributions, aspect ratios, orientations of long and short axes, and termination proportions and styles, and possible sampling bias. The sub-seismic data set (e.g., fracture log)

may then be mapped to a portion of the area represented in the seismic-scale fracture network (e.g., the SDP model), as at 198.

The sub-seismic fracture data may include three-dimensional, sub-seismic fracture network data for a relatively small subset of the area represented in the SDP model. Thus, the sub-seismic fracture data, when mapped to the portion of the SDP model, may be employed to characterize certain classifications of planes, intersections, and distributions on a sub-seismic scale (as described above). The fracture network information contained in the sub-seismic data may be correlated with the seismic discontinuity planes in the same location, defining a 3D space of fracture correlations that are sufficiently self-similar/scale-independent as to be treatable as a fractal.

Accordingly, the seismic-resolution SDP network may be employed as a 3D "training image," which can be used to model the sub-seismic fracture network in each fractal region thereof, as at 200. The training image may then be applied to characterize sub-seismic scale portions of the SDP model to which the sub-seismic data is not directly mapped, thereby upscaling the seismic resolution of the SOP model to sub-seismic resolution, directly using its 3D network properties, as at 200.

Further, such upscaling may proceed using any suitable statistical approach, for example, fracture plane- and set-based modeling or multi-point statistics modeling such as that available in PETREL® (commercially available from Schlumberger Technology Corporation), assuming a generally fractal nature of the 3D fracture network in a region of the SDP model being upscaled.

The fractal nature of the region of the SDP may be determined prior to implementation of one or more aspects, for example, while or after mapping at 198, by checking the characterizations of the region on at least two different scales. Thus, for example, increased certainty about discontinuity planes traversing horizon boundaries, other fractures, etc., may be stochastically and deterministically modeled by using fracture network data about particular classifications of discontinuity planes.

The method 100 may also include performing quality control checks on the upscaled data, for example, to determining whether the various thresholds were accurately set during previous portions of the method 100. Accordingly, the new sub-seismic 3D fracture network, generated by using the training image can be compared to the seismic scale SDP model, to determine the extent to which the seismic-level data and sub-seismic model remains consistent to form a single 3D fracture network population. Thereafter, if desired, adjustments may be made and the method 100 repeated.

Figure 6:
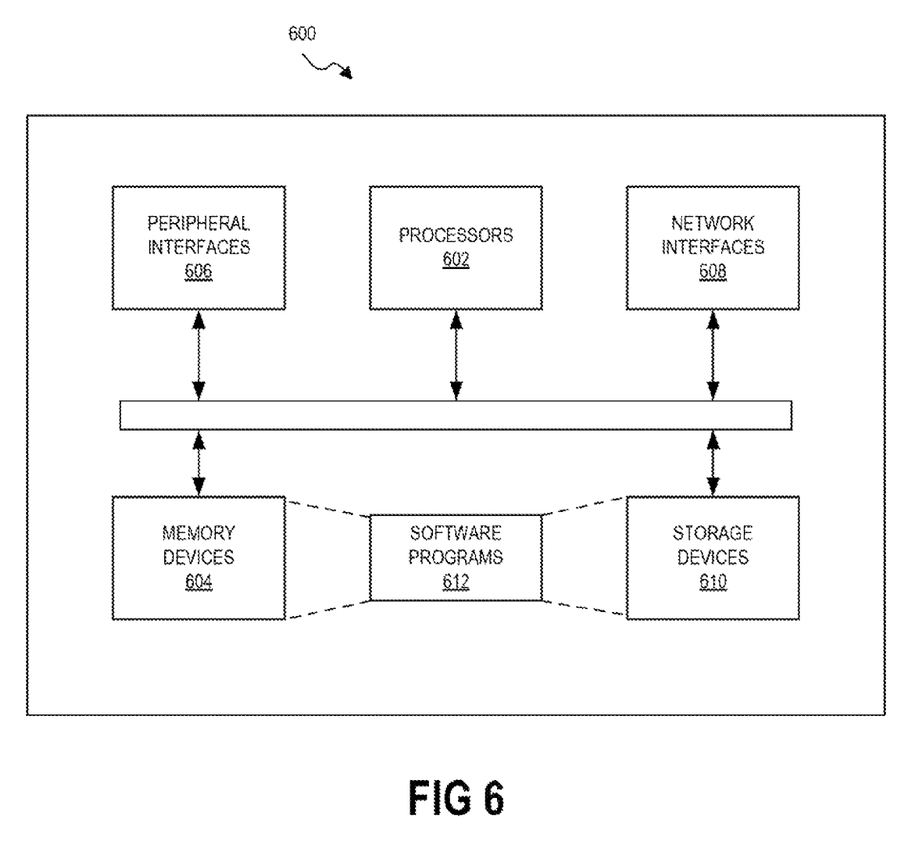
FIG. 6 illustrates a schematic view of a processor system, according to an embodiment.

Embodiments of the disclosure may also include one or more processor (i.e., computer) systems which may be implemented, for example, to execute the automatic modeling method 100. FIG. 6 illustrates a schematic view of such a processor system 600, according to an embodiment. The processor system 600 may include one or more processors 602 of varying core (including multiple cores) configurations and clock frequencies. The one or more processors 602 may be operable to execute instructions, apply logic, etc. It will be appreciated that these functions may be provided by multiple processors or multiple cores on a single chip operating in parallel and/or communicably linked together.

The processor system 600 may also include a memory system, which may be or include one or more memory devices and/or computer-readable media 604 of varying physical dimensions, accessibility, storage capacities, etc. such as flash drives, hard drives, disks, random access memory, for storing data, such as images, files, and program instructions for execution by the processor 602. In an embodiment, the computer-readable media 604 may store instructions that, when executed by the processor 602, are configured to cause the processor system 600 to perform operations. For example, execution of such instructions may cause the processor system 600 to implement one or more portions and/or embodiments of the method 100 described above.

The processor system 600 may also include one or more network interfaces 608. The network interfaces 608 may include any hardware, applications, and/or other software. Accordingly, the network interfaces 608 may include Ethernet adapters, wireless transceivers, PCI interfaces, and/or serial network components, for communicating over wired or wireless media using protocols, such as Ethernet, wireless Ethernet, etc.

The processor system 600 may further include one or more peripheral interfaces 606, for communication with a display screen, projector, keyboards, mice, touchpads, sensors, other types of input and/or output peripherals, and/or the like. In some implementations, the components of processor system 600 need not be enclosed within a single enclosure or even located in close proximity to one another, but in other implementations, the components and/or others may be provided in a single enclosure. In at least one example, the processor system 600 may be configured to display the seismic-resolution data set (e.g., the SDP model), the sub-seismic data set (e.g., facies model), or both on the display screen, which may be incorporated into the method 100, for example, showing analysis results, progress, look-ahead previews of results associated with selected thresholds, etc.

The memory device 604 may be physically or logically arranged or configured to store data on one or more storage devices 610. The storage device 610 may include one or more file systems or databases in any suitable format. The storage device 610 may also include one or more software programs 612, which may contain interpretable or executable instructions for performing one or more of the disclosed processes. When requested by the processor 602, one or more of the software programs 612, or a portion thereof, may be loaded from the storage devices 610 to the memory devices 604 for execution by the processor 602.

Those skilled in the art will appreciate that the above-described componentry is merely one example of a hardware configuration, as the processor system 600 may include any type of hardware components, including any necessary accompanying firmware or software, for performing the disclosed implementations. The processor system 600 may also be implemented in part or in whole by electronic circuit components or processors, such as application-specific integrated circuits (ASICs) or field-programmable gate arrays (FPGAs).

The foregoing description of several possible embodiments has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 600 may be used to execute programs according to instructions received from another program or from another computing system altogether. Similarly, commands may be received, executed, and their output returned entirely within the processing and/or memory of the processor system 600. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for modeling fracture networks, comprising:
    receiving a seismic-resolution data set, wherein the seismic-resolution data set represents a subterranean area and was collected by a seismic data collection device;
    mapping a sub-seismic data set to a portion of the seismic-resolution data set;
    defining a fractal region of the seismic-resolution data set containing the portion thereof to which the sub-seismic data set is mapped;
    generating, using a processor, a training image for one or more sub-seismic scale characteristics of the one or more fracture networks of the seismic-resolution data set using the portion of the seismic-resolution data set; and
    modeling, using the processor, the one or more sub-seismic scale characteristics of the one or more fracture networks of the fractal region of the seismic-resolution data set outside of the portion, using the training image.

2. The method of claim 1, further comprising:
    classifying one or more discontinuity planes of the one or more fracture networks of the seismic-resolution data set based at least partially on shape, size, orientation, or a combination thereof, to generate one or more discontinuity plane classifications; and
    classifying one or more potential faults in the seismic-resolution data set to generate one or more fault classifications,
    wherein defining the fractal region comprises comparing one or more characteristics of the one or more discontinuity planes and one or more characteristics of the one or more potential faults in at least two scales based on the one or more discontinuity plane classifications and the one or more fault classifications.

3. The method of claim 2, wherein classifying the one or more discontinuity planes comprises:
    determining first and second dimensions of a first one of the discontinuity planes; and
    comparing a ratio of the first and second dimensions to a threshold ratio.

4. The method of claim 3, wherein classifying the one or more discontinuity planes further comprises:
    determining whether a circle or square is a fit for the first one of the one or more discontinuity planes, when the ratio is above the threshold ratio; and
    determining whether a rectangle or an ellipsis is a fit for the first one of the one or more discontinuity planes, when the ratio is below the threshold ratio.

5. The method of claim 2, wherein classifying the one or more potential faults comprises classifying a potential fault of the one or more potential faults as a joint plane, a normal fault, a growth fault, a listric growth fault, a listric fault, a thrust fault, or a reverse fault.

6. The method of claim 2, wherein the one or more discontinuity planes comprises a plurality of discontinuity planes, the method further comprising identifying an intersection between at least two of the discontinuity planes.

7. The method of claim 6, further comprising classifying the intersection based at least partially on an angle of intersection defined for the intersection between the at least two of the discontinuity planes.

8. The method of claim 1, wherein modeling comprises using a multipoint statistics modeling technique.

9. The method of claim 1, wherein the seismic-resolution data set comprises a seismic discontinuity plane model.

10. The method of claim 1, wherein the sub-seismic data set comprises a well log, a core data, analogue data or a combination thereof.

11. The method of claim 1, further comprising identifying one or more discontinuity planes in the seismic-resolution data set, comprising:
    identifying one or more fault/fracture points in the seismic-resolution data set;
    selecting a seed fault/fracture point for a first discontinuity plane;
    identifying one or more candidate neighbor fault/fracture points to the seed fault/fracture point;
    determining that at least one of the one or more candidate neighbor fault/fracture points is a likely neighbor based at least partially on an orientation, attribute threshold, or both;
    adding the likely neighbor to the first discontinuity plane; and
    using the likely neighbor as a next seed fault/fracture point to continue growing the first discontinuity plane.

12. The method of claim 1, further comprising displaying a result of the modeling using a display coupled to the processor.

13. A processor system, comprising:
    one or more processors; and
    a memory system comprising one or more computer-readable media containing instructions that, when executed by at least one of the one or more processors, are configured to cause the processor system to perform operations, the operations comprising:
        receiving a seismic-resolution data set comprising one or more fracture networks, wherein the seismic-resolution data set represents a subterranean area and was collected by a seismic data collection device;

mapping a sub-seismic data set to a portion of the seismic-resolution data set;

determining that a region of the seismic-resolution data set containing the portion thereof to which the sub-seismic data is mapped is treatable as a fractal;

generating a training image for sub-seismic scale characteristics of the one or more fracture networks of the seismic-resolution data set using the portion of the seismic-resolution data set; and modeling the sub-seismic scale characteristics of the one or more fracture networks of the seismic-resolution data set outside of the portion, using the training image.

14. The system of claim 13, wherein the operations further comprise:

classifying discontinuity planes of the one or more fracture networks of the seismic-resolution data set based at least partially on shape, size, orientation, or a combination thereof, to generate discontinuity plane classifications; and classifying potential faults in the seismic resolution data set to generate fault classifications, wherein determining that the region is treatable as a fractal includes comparing characteristics of the planes and potential faults in at least two scales based on the discontinuity plane classifications and the fault classifications.

15. The system of claim 14, wherein classifying the discontinuity planes comprises:

determining first and second dimensions of a first one of the discontinuity planes;

comparing a ratio of the first and second dimensions to a threshold ratio;

determining whether a circle or square is a fit for the first one of the discontinuity planes, when the ratio is above the threshold ratio; and determining whether a rectangle or an ellipsis is a fit for the first one of the discontinuity planes when the ratio is below the threshold ratio.

16. The system of claim 14, wherein classifying the potential faults comprises classifying the potential faults as joint planes, normal faults, growth faults, listric faults, thrust faults, or reverse faults.

17. The system of claim 14, the operations further comprising:

classifying intersections between the discontinuity planes based at least partially on an angle of intersection defined for each intersection between two of the discontinuity planes.

18. The system of claim 13, wherein the seismic resolution data set comprises a seismic discontinuity plane extraction and conversion to seismic-scale fault/fracture model, and the sub-seismic data set comprises a well log, a core data, analogue data or a combination thereof.

19. The system of claim 13, wherein the operations further comprise identifying discontinuity planes in the seismic-resolution data set, comprising:

identifying fault/fracture points in the seismic resolution data set;

selecting a seed fault/fracture point for a first discontinuity plane;

identifying one or more candidate neighbor fault/fracture points to the seed point;

determining that at least one of the one or more candidate neighbor points is a likely neighbor based at least partially on orientation, attribute threshold, or both;

adding the likely neighbor to the first discontinuity plane; and using the likely neighbor as a next seed point to continue growing the discontinuity plane.

20. A computer-implemented method for modeling fracture networks, comprising:

receiving a seismic-resolution data set, wherein the seismic-resolution data set represents a subterranean area and was collected by a seismic data collection device;

growing discontinuity planes from fault/fracture points contained in the seismic-resolution data set;

classifying the discontinuity planes according to shape, size, orientation, or a combination thereof to generate plane classifications;

classifying intersections between the discontinuity planes to generate intersection classifications;

classifying fractures and faults in the seismic resolution data set to generate fault/fracture classifications;

mapping a sub-seismic data set to a portion of the seismic-resolution data set, wherein the sub-seismic data set contains data indicative of sub-seismic fracture network characteristics of the portion of the seismic-resolution data set;

defining a fractal region of the seismic-resolution data set containing the portion thereof to which the sub-seismic data set is mapped;

generating, using a processor, a training image for sub-seismic scale characteristics of the one or more fracture networks of the seismic-resolution data set using the portion of the seismic-resolution data set and the plane classifications, the intersection classifications, and the fault/fracture classifications; and modeling, using the processor, the sub-seismic scale characteristics of the one or more fracture networks of the fractal region of the seismic-resolution data set outside of the portion, using the training image.

* * * * *